United States Patent
Kolin

[11] 3,838,683
[45] Oct. 1, 1974

[54] SELF-CONTAINED ELECTROMAGNETIC FLOW SENSOR

[75] Inventor: Alexander Kolin, Bel Air, Calif.

[73] Assignee: The Regents of the University of California, Berkeley, Calif.

[22] Filed: Jan. 21, 1972

[21] Appl. No.: 219,685

Related U.S. Application Data

[63] Continuation-in-part of Ser. No. 874,094, Nov. 3, 1969, abandoned.

[52] U.S. Cl............................ 128/2.05 F, 73/194 EM
[51] Int. Cl.............................................. A61b 5/02
[58] Field of Search ..... 128/2.05 F, 2.05 R, 2.05 V, 128/2 R; 73/194 EM

[56] References Cited
UNITED STATES PATENTS

| | | | |
|---|---|---|---|
| 3,347,224 | 10/1967 | Adams............................ | 128/2.05 F |
| 3,405,708 | 10/1968 | Webster, Jr. ................... | 128/2.05 F |
| 3,472,230 | 10/1969 | Fogarty........................... | 128/345 X |
| 3,495,586 | 2/1970 | Regenbogen ............................ | 128/6 |
| 3,516,399 | 6/1970 | Barefoot......................... | 128/2.05 F |
| 3,529,591 | 9/1970 | Schuette........................ | 128/2.05 F |
| 3,605,726 | 9/1971 | Williams et al................. | 128/2.05 F |
| 3,661,148 | 5/1972 | Kolin............................ | 128/2.05 P |

OTHER PUBLICATIONS

Mills, C. J., Physics in Medicine & Biol., 1966, Vol. 11, No. 2, pp. 323–324
Kolin, A., Science, Vol. 130, Oct. 23, 1959, PP. 1088–1097.
Kolin, A. et al., Physiology, Vol. 59, Jan. 1968, PP 808–815.

*Primary Examiner*—Kyle L. Howell
*Attorney, Agent, or Firm*—Jessup & Beecher

[57] ABSTRACT

An electromagnetic catheter type flow sensor is provided in which a magnetic field is generated by two roughly parallel insulated bundels of wire carrying equal currents in opposite directions, and which includes electrodes affixed to the insulated wire bundles. The flow sensor may be introduced, for example, through a branch artery into a main artery in a human or animal to measure blood flow in the main artery, and it is constructed to constrict as it is introduced through the branch artery and to expand when in the main artery so as to span at least a portion of the diameter of the main artery.

9 Claims, 6 Drawing Figures

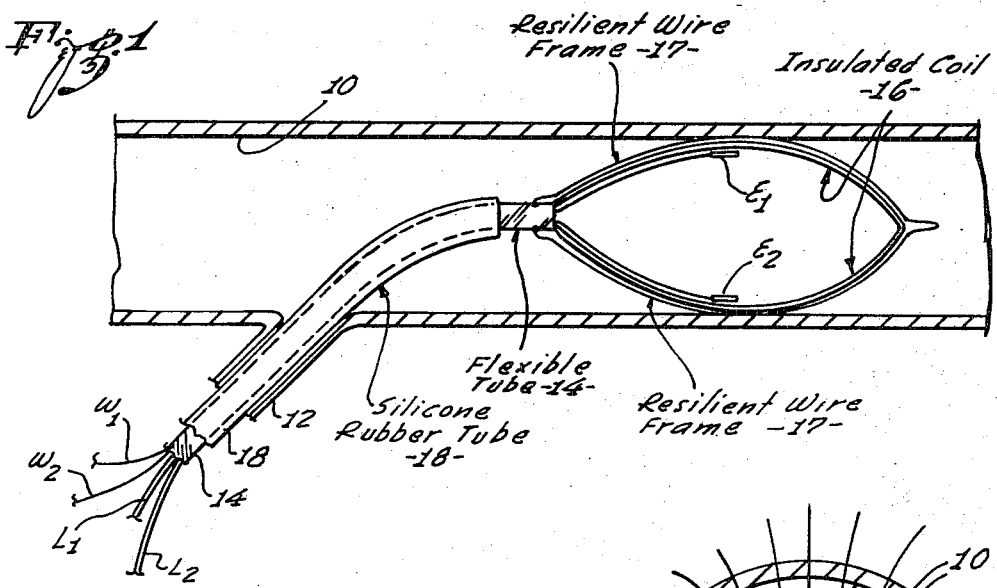
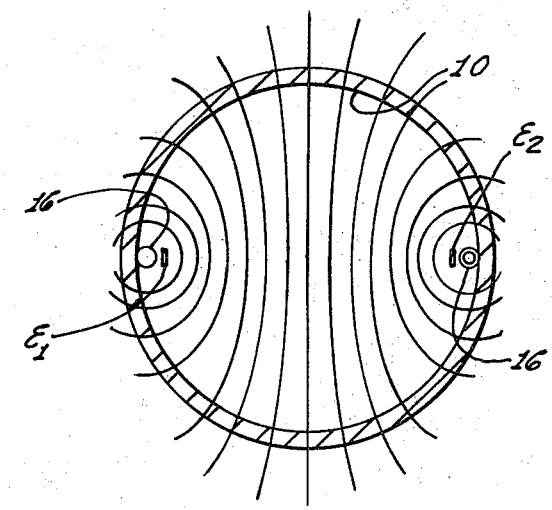
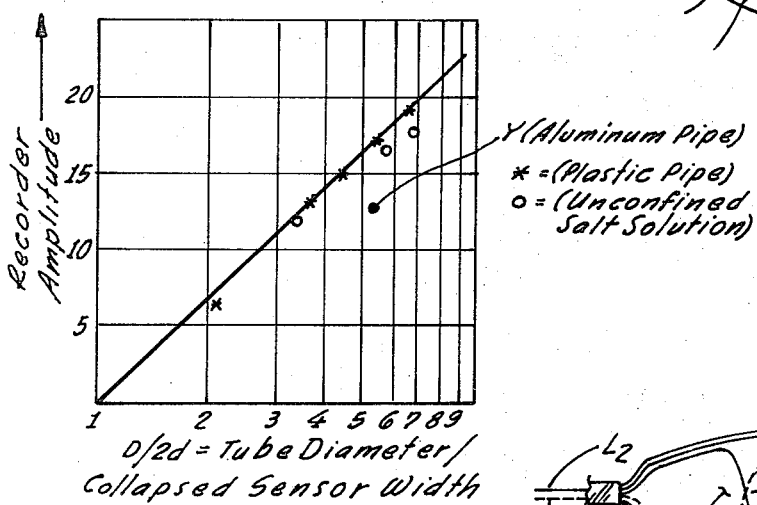
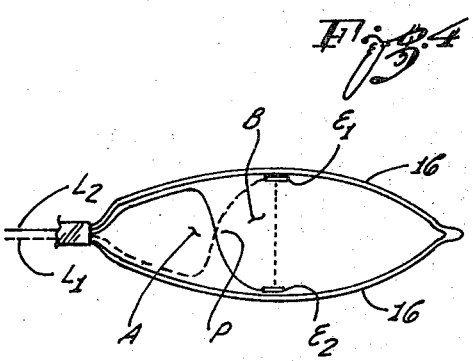

SELF-CONTAINED ELECTROMAGNETIC FLOW SENSOR

This application is a continuation in part of Copending Application Ser. No. 874,094, now abandoned, which was filed Nov. 3, 1969 in the name of the present inventor for "SELF-CONTAINED VARIABLE GAUGE ELECTROMAGNETIC FLOW METER."

The invention described herein was made in the course of, and under a grant from the United States Public Health Service, Department of Health, Education and Welfare; and under a contract from the Office of Naval Research.

BACKGROUND OF THE INVENTION

The volume rate of blood flow can be determined quantitatively by an electromagnetic flow meter applied externally to a blood vessel (A. Kolin in O. Glasser ed Medical Physica, 3 141-155, 1960). Such an application, however, requires surgical exposure of the blood vessel and often involves extensive surgery. This is clearly undesirable, if routine use is to be made of electromagnetic flow meters for clinical measurement of blood flow in patients.

In order to overcome the limitations of the prior art electromagnetic flow meters, catheter type electromagnetic flow meters have been developed which comprise an electromagnetic flow transducer incorporated into a thin flexible catheter type tube, which may be inserted through a branch vessel, such as the femoral artery or jugular vein, and from where it may be maneuvered into a major artery, such as the aorta or pulmonary artery, or vein, such as the vena cava.

However, the prior art catheter type flow meters are still rather large, and are typically of from 3–4 millimeters in diameter. Such prior art catheter type flow meters require a larger opening in the blood vessel than would normally be considered safe, and instruments of the size of the prior art catheter do not lend themselves conveniently to introduction percutaneously through a small opening in the skin of the patient.

The improved catheter type electromagnetic flow meter of the present invention is constructed so that the problem of excessive dimensions is solved, and, as will be described, the improved flow meter of the invention includes further features representative of distinct advantages over the electromagnetic catheter type flow meter now in use. In addition, the flow meter can serve as an arterial diameter gauge, which is helpful in converting the measurements of flow velocity in cm/sec into a measurement of volume rate of flow in cm³/sec.

As is well known, electromagnetic flow meters include means for producing a magnetic field across the path of the moving liquid, so that the liquid is caused to generate a voltage as it moves through the field, with the voltage being directly proportional to the velocity of the liquid. A pair of electrodes are provided in contact with the liquid, and on opposite sides of the conduit carrying the liquid, so that the voltage developed by the liquid may be measured. In this way, practical flow measurements may be made on any liquid which exhibits electrically conductive characteristics.

Most of the electromagnetic catheter type flow meters in present use are actually local velometers which measure merely the local velocity within a conduit at the location of the flow center, and they are not centered within the blood vessel itself. The volume rate of flow must then be calculated from the local velocity measurements of such velometers and on the assumption that a uniform velocity exists throughout the blood vessel cross-section. The transducer of the present invention, on the other hand, functions as a non-local velometer and the flow throughout the entire conduit cross section contributes to the flow signal. Moreover, the flow meter of the invention has the capability of centering itself automatically to fit blood vessels of a wide range of diameters.

A most important feature of the electromagnetic catheter type flow meter of the invention is its resilient collapsibility to a transverse dimension of about 2.7 millimeters, for example, which is required for percutaneous introduction, and its subsequent ability resiliently to enlarge and expand itself so as to adapt itself to the particular conduit in which it is inserted. A further advantage of the improved flow meter of the invention is the absence of a rigid transducer.

Another important feature of the electromagnetic catheter type flow meter of the invention is the fact that the instrument remains effective in conduits of different lumens, in which it displays a logarithmic relationship between sensitivity and lumen diameter. The instrument of the invention can be used to measure branch flow as well as the flow in the main conduit. An improved technique for guiding the electrode leads, as will be described, permits achievement of a zero base line error which remains negligible as the sensor dimensions expand and contract to fit conduits of different lumens.

"Various catheter-type electromagnetic flow meters are described, for example, by C. J. Mills, Phys. Med. Biol. 11, 323 (1966); R. F. Bond and C. A. Barefoot, J. Appl. Physiol. 23, 403 (1967); A. Kolin Proceedings of the National Academy of Science 57, 1331 (1967); A. Kolin et al. Circulation Res., 21, 889 (1967); A. Kolin et al, Proceedings of the National Academy of Science, 59, 808, (1968)."

SUMMARY OF THE INVENTION

The invention provides an improved electromagnetic catheter type flow meter, in which the magnetic field is generated by two roughly parallel bundles of insulated wire carrying equal currents in opposite directions, and which includes sensing electrodes which are affixed to the insulated wire bundles. The flow sensor of the invention is flexible, and the flow transducer is designed to collapse and constrict as it is introduced through a branch artery and resiliently to expand in the main artery over the span of the diameter. The principle on which the operation of the improved flow meter is predicated is suitable for branch flow measurement as well as for measurement of flow in a major artery or vein by the same transducer.

BRIEF DESCRIPTION OF THE DRAWINGS

FIG. 1 is a schematic representation of an electromagnetic catheter flow meter constructed in accordance with the concepts of the present invention, and illustrated as being inserted through an artery branch into a main artery;

FIG. 2 is a cross section of the artery of FIG. 1, on an enlarged scale, and showing the magnetic field traversing the artery;

FIG. 3 is a graph representative of the dependence of transducer sensitivity on conduit diameter and conductivity of the conduit wall;

FIG. 4 is a further representation of the catheter flow meter of the invention, and showing the manner in which the electrode leads may be positioned to suppress transformer electromotive force, and so as to obtain a zero reading at zero flow of the liquid and independent of the conduit diameter;

DETAILED DESCRIPTION OF THE ILLUSTRATED EMBODIMENTS

Figure 5:
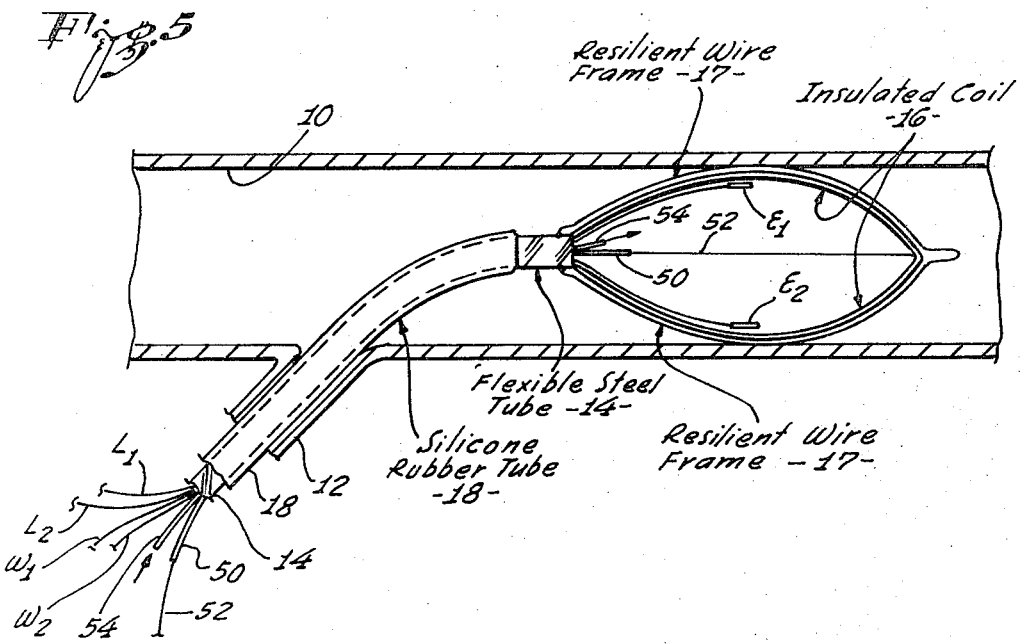
FIG. 5 is a schematic representation of a modified flow meter constructed in accordance with a second embodiment of the invention.

In the representation of FIG. 1, the wall of a main artery, or other blood vessel, into which the catheter electromagnetic flow meter of the invention is inserted, is represented by the numeral 10, and the wall of a branch artery, through which the datheter is inserted into the main artery, or blood vessel 10, is designated by the numeral 12. The instrument of the invention includes a catheter section which is in the form, for example, of an elongated flexible tube 14, and through which a pair of wires $L_1$ and $L_2$, and a further pair of wires $W_1$ and $W_2$ extend. The wires $W_1$ and $W_2$ are connected to respective sides of a coil 16.

The coil 16, as shown in FIG. 1, has a generally lenticular or oval shape, and is adapted to be compressed into an elongated configuration of a transverse dimension, as mentioned, of about 2.7 millimeters, for percutaneous introduction through the artery branch 12 and into the artery 10. A pair of electrodes designated $E_1$ and $E_2$ are mounted on the respective sides of the coil 16 in contact with the blood flowing through the artery 10, and the wires $L_1$ and $L_2$ are connected to the electrodes.

The coil 16 has any desired number of turns within the prescribed space limitations and within the prescribed flexibility requirements. The coil presents two substantially parallel sides of wire carrying current in opposite directions, so as to establish a magnetic field across the artery 10, as best shown in FIG. 2.

In FIG. 2, the artery 10 is shown on an enlarged scale as a transverse section, and the coil 16 is shown as a single turn, with the current in the right-hand turn extending up out of the plane of the paper, and the current in the left-hand turn extending down into the plane of the paper. The current in the coil 16 generates the illustrated magnetic field across the artery 10, so that the blood flowing through the magnetic field develops a voltage which is sensed by the electrodes $E_1$ and $E_2$.

As mentioned, the coil 16 may have a generally loop shape, although such a shape is not essential, and it generates a magnetic field which intersects the plane of the coil at right angles. The coil consists of any desired number of turns N, and the coil may be analogized to a pair of parallel leads which have been pulled apart to produce a terminally closed loop coil cross section shown in FIGURE 1.

To insure that the leads maintain the illustrated terminally closed loop shape, a frame 17 of this shape made, for example, from a resilient beryllium copper wire used to support the coil 16. The coil 16 may be adhesively attached to the frame 17. The two sides of the coil 16 and frame 17 are collapsed towards one another to enable the structure to pass through a narrow opening, and the sides of the coil spring open again under the influence of the resilient frame 17, after emerging into a wider space, so that the coil always assumes the entire inner diameter of the conduit in which it is placed. The resiliency of the coil could, alternately, be achieved by providing a rubber or silicon sleeve for the coil.

The resilient frame 17 for the coil 16 may be formed, for example, of a 10 mil. beryllium copper wire whose ends are soldered to the end of the tube 14. The tube 14 may, for example, be of 18 gauge stainless steel hypodermic tubing. The individual wires of the coil 16 may be threaded through silicone rubber tubing, such as Dow Corning "Silastic" medical grade 0.025 inches inner diameter, and 0.047 inches outer diameter, for insulation purposes. An alternative method of insulation would be to paint the wires with, for example, an insulating cement such as General Electric RTV 112 "Silastic" cement; or to coat the wires with Teflon, or silicone rubber, or other material compatible with blood and which will not coagulate the blood.

The flexible tube 14, which encloses the coil lead wires $W_1$, $W_2$ and the electrode lead wires $L_1$, $L_2$ may be coated, for example, with a layer 18 of silicone rubber, and it forms an unsplit section of the catheter instrument. The insulated wires of the coil 16 may be cemented to one another by an appropriate cement, such as General Electric RTV112 "Silastic" cement, so that all the wires may be thoroughly sealed and electrically insulated from the liquid when the instrument is submerged. The tip of the coil may be encapsulated in a suitable insulating cement, such as General Electric RTV112 "Silastic" cement.

The electrodes $E_1$ and $E_2$ may be soldered to the inner ends of the wires $L_1$ and $L_2$, and the wires may be copper wires insulated by polyvinyl chloride, or Teflon. A current, for example, of 0.5-1 amps may be passed through the coil 16 to produce the magnetic field shown by the lines of force in FIG. 2. An important function of the terminally closed resilient frame 17 is to hold the electrodes $E_1$ and $E_2$ as far from each other as possible.

To explain the principle of operation in idealized form, the coil 16 should be considered to be sufficiently long so that the sides of the coil may be considered as two infinitely long parallel wires of negligible diameter carrying currents of equal magnitude in opposite directions, such as shown in the schematic representation of FIGURE 2. The magnetic field lines, as shown in FIGURE 2, pass through a line joining electrodes $E_1$ and $E_2$ perpendicular to the sides of the coil 16. However, such a shape of the coil as shown in FIGURE 1 is not essential for satisfactory operation of the unit. The coil could be circular, near circular, or angular, for example.

The magnetic field is not uniform. Its intensity increases from the conduit's central axis towards the electrodes, and decreases for displacements along a line perpendicular to the axis of the conduit and to the axis of the electrodes $E_1$–$E_2$. However, this type of magnetic field non-uniformity does not prevent satisfactory linear performance of the flow meter of the invention over the laminar and turbulent flow regimes, and even greater field non-uniformities can be tolerated without loss of linearity over a wide flow range covering the laminar and turbulent regimes. (See A. Kolin and R. Wisshaupt, IEEE Transactions Biomed. Electron. 10, 60, (1963).

In the case of pulsating arterial blood flow one actually need not be concerned with transducer performance in the laminar flow regime, since the velocity is practically uniform throughout the artery cross section (D. A. McDonald, Blood Flow in Arteries, Baltimore, Williams & Wilkins Co., 1960).

The following considerations, therefore, will be limited to the practically important case of turbulent flow across the non-uniform magnetic field of the flow transducer.

A uniform flow of blood is assumed to traverse the cross section of the artery 10 shown in FIGURE 2 at right angles to the plane of the drawing. As a result, an electromotive force will be induced in the conductive fluid, and this electromotive force will be detected by a potential difference between the electrodes $E_1$ and $E_2$. The electromotive force may be calculated from the expression for the magnetic field B produced by a straight current-carrying bundle of wires:

$$B = B_0/r \qquad (1)$$

Where:
$B_0$ is the field at unit distance from the center of the bundle.

From the flow meter equation:

$$dV = kBvdr \qquad (2)$$

Where:
$dV$ is a voltage increment across the radial distance $dr$,
$v$ is the local velocity of flow, and
$k$ is a constant depending upon the choice of units.

Integration of Equation (2), using the B value of Equation (1), yields a logarithmic expression. The measured sensitivity $$S = V/v \qquad (3)$$

of the transducer is represented to a good approximation for large $D/d$ values by a logarithmic function of the ratio of the diameter D of the conduit 10 of FIGURE 2 and the diameter d of the wire bundle 16:

$$S = c \cdot \ln D/2d \qquad (4)$$

Where:
c is a constant depending on the choice of units and intensity of the field generating current.

The sensitivity drops to zero when the electrodes touch each other at $D = 2d$. FIG. 3 shows a plot of recorded flow readings as a function of log $D/2d$.

Because of the flexibility and deformability of the flow transducer described above, which is essentially a split section of a catheter, it may be maneuvered into side brances of the arteries in accordance with standard angiographic practice and thus be able to measure blood flow through organs supplied by the chosen branch. The diameter of the artery whose flow is being measured must be known to ascertain the sensitivity of the transducer from a calibration curve and to obtain the rate of volume flow as a product of the measured average velocity v with the cross sectional area of the blood vessel.

However, the transducer possesses the advantage in that it is not necessary to inject radiopaque materials to ascertain the artery diameter. Since the two sides of the coil 16 are in contact with the artery wall, a transverse X-ray exposure may be used to yield a radiogram from which the artery diameter may be easily determined. The catheter flow meter of the invention, therefore, fulfills a collateral function, that is that of an arterial diameter gauge. Moreover, X-ray time exposures may then be used to reveal the extent of artery pulsations which, in turn, indicate the degree of arteriosclerosis of the patient.

Since the straight line of FIG. 3 passes through the origin, it is sufficient to calibrate the transducer at one arbitrary tube diameter. Since a radiogram of the transducer in situ gives the artery diameter, the calibration for a given blood vessel follows from a graph such as that of FIG. 3.

As mentioned above, another point of importance is the determination of a base line corresponding to zero flow of the liquid being measured. If a line drawn between the electrodes $E_1$ and $E_2$ in FIG. 1 is considered to represent the equivalent resistance of the electrolyte that establishes electrical continuity between the electrodes, it will be seen that the loop thus created in the electrode lead circuit may be considered as the secondary of a transformer whose primary is the coil carrying the alternating current supplied to the coil 16 by the wires $W_1$, $W_2$.

The magnetic field of the primary winding is non-uniform and its intensity varies as the distance between the sides of the coil 16 is varied. Thus, a pulsating artery, by changing the distance between the sides of the coil 16 would provide a modulated signal of carrier frequency, unrelated to flow, induced in the secondary loop. The signal thus induced by transformer action in the absence, as well as in the presence, of liquid flow can be as high as two orders of magnitude greater than the anticipated flow signal. Therefore, the elimination of this transformer induced signal is essential to insure the practicability of the catheter flow meter under consideration.

The schematic representation of FIGURE 4 illustrates how the elimination of the transformer induced EMF has been achieved. Instead of the electrode lead wires $L_1$ and $L_2$ being guided all the way across the sides of the coil 16 to the electrodes $E_1$ and $E_2$ as shown in FIGURE 1, the lead wires are crossed at a point P before reaching the electrodes. The secondary loop of the electrode leads are thus sub-divided into two sub-loops A and B which are effectively wound in opposite directions to one another. Therefore, a current circling the loop A through the leads $L_1$ and $L_2$ in a clockwise direction flows counterclockwise around the loop B.

By shifting the location of the crossover point of the two lead wires $L_1$ and $L_2$ (which are insulated by silicone rubber, for example), the relative areas of the loops A and B may be adjusted. In the course of the adjustment, the transformer electromotive force induced in the secondary circuit diminishes and can be made to vanish. When that is achieved, the wires may be attached to one another by appropriate cement, to stabilize the position of the crossover point P.

The embodiment of FIG. 5 is generally similar to that of FIG. 1, and similar components have been designated by the same numbers. However, in the latter embodiment, the frame 17 is made flexible and is made to expand, not by the resiliency of the frame but, rather, by pulling a draw string 52. When the pull is discontinued, the frame collapses to minimal width due to its flexibility. An additional tube 50 is provided, for example, which extends through the silicone tube 14 and through the tube 18 into the blood vessel 10. The draw string 52 extends through the tube 50 and is attached to the remote end of the assembly, as shown. Then, the assembly may initially be compressed, as before, and inserted into the blood vessel, and it may subsequently be expanded to the illustrated shape, merely by pulling the draw string.

An additional tube 54 may also extend through the tubes 14 and 18 into the blood vessel 10 to permit test fluids to be introduced into the blood vessel. Moreover, blood pressure measurements may be made by transmission of pressure through the tube.

Figure 6:
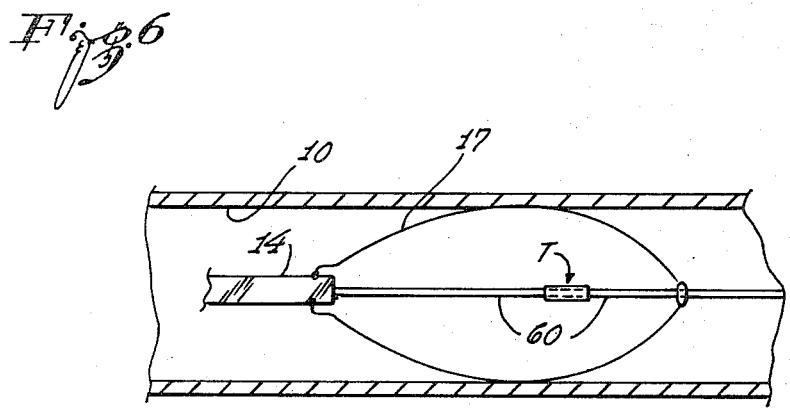
FIG. 6 shows the frame of the flow meter of the invention used to center a catheter sensor in a conduit.

In addition, the frame 17 of FIGS. 1 and 5 may be used, for example, for supporting any other type of catheter sensor T in the blood vessel 10 (FIG. 6), so as to center the sensor in the conduit 10. The sensor is mounted on a cable 60 which extends from one end of the frame to the other.

The flow meter described above may be used to measure other fluid flows in other conduits. For example, it is particularly useful in conjunction with magnetic or non-magnetic metallic pipes since there is no tendency for the pipe itself to destroy the flow signal by either electrical or magnetic short circuits and the operation of the unit is not invalidated. The curve of FIG. 3 shows a point (Y) determined by measurement in an aluminum pipe; whereas the circles mark points of measurement in dielectric (plastic) pipes. The crosses, on the other hand, are points obtained by binding the frame with a constricting thread to change the interelectrode distance.

An improved electromagnetic catheter type flow meter is provided, therefore, which has the ability to be compressed into an extremely small size so that it may be inserted into a blood vessel percutaneously and which has the ability to center itself automatically to fit blood vessels of a wide range of diameters. It is to be noted that the configuration of the magnetic field established by the coil 16 is such that the assembly may be used in conjunction with metallic conduits and there is no tendency for the conduit to affect the field and induced flow signal in any way as would militate against the proper operation of the instrument. Also, when so used, the electrodes, or coil, or both, may be permanently installed in the pipe.

While particular embodiments of the invention have been shown and described, modifications may be made, and it is intended in the following claims to cover all such modifications which come within the spirit and scope of the invention.

What is claimed is:

1. Flow sensor comprising:
   deformable terminally closed loop means collapsible to an elongated narrow configuration, adapted to be inserted into a conduit in a collapsed condition and to reside in the conduit, and expandable therein to a loop configuration, said terminally closed loop means including a coil means for forming a magnetic field within the conduit,
   sensor means supported by said loop means, and
   electrically conductive lead means connected to said sensor means.

2. Sensor in accordance with claim 1, wherein said sensor means comprises a pair of spaced electrodes mounted on opposite sides of said terminally closed loop means and supported thereby, in position such that the line joining said electrodes is parallel to the plane of said terminally closed loop means.

3. Sensor in accordance with claim 2, wherein said coil means included in said terminally closed loop means forms a magnetic field transversely of said line joining said electrodes.

4. Sensor in accordance with claim 1, wherein said deformable terminally closed loop means is flexibility resilient and is biased outwardly, whereby said loop means may be laterally contracted for percutaneous insertion into an animal body and then expanded within a biological fluid-carrying conduit of the animal body.

5. Sensor in accordance with claim 1, wherein said terminally closed loop means includes a flexible wire frame adapted to expand towards the wall of the conduit.

6. Sensor in accordance with claim 2, which includes an elongated tubular member attached to said terminally closed loop means and supporting said terminally closed loop means, wherein said electrically conductive lead means includes a first pair of electric wires respectively connected to said electrodes and extending through said elongated tubular member, and a second pair of electric wires respectively connected to said coil means and extending through said elongated tubular member.

7. Sensor in accordance with claim 6, in which said wires of said first pair cross one another within said terminally closed loop means so as to suppress unwanted transformer electromotive forces.

8. Sensor in accordance with claim 5, and which includes a drawstring attached to said frame for opening said terminally closed loop means to an expanded position within the conduit.

9. Sensor in accordance with claim 5, in which said flexible frame is flexibly resilient and is biased outwardly.

* * * * *